United States Patent Office 3,409,656
Patented Nov. 5, 1968

3,409,656
PROCESS FOR PREPARATION OF
ISOTHIOCYANATES
Gerhard F. Ottmann, Hamden, and Haywood Hooks, Jr., West Haven, Conn., assignors to Olin Mathieson Chemical Corporation, New Haven, Conn., a corporation of Virginia
No Drawing. Filed Nov. 1, 1965, Ser. No. 506,009
3 Claims. (Cl. 260—454)

ABSTRACT OF THE DISCLOSURE

A process for providing isothiocyanates by the thermal dissociation of O,O'-dialkyl-S-carbamoyl phosphorodithioates. The phosphorodithioates are provided by the reaction of isocyanates with O,O-dialkyl dithiophosphoric acids, and thus a process for the conversion of isocyanates to isothiocyanates is disclosed.

---

This invention relates to a process for preparing isothiocyanic acid esters and to the O,O'-dialkyl-S-carbamoyl phosphorodithioates which are utilized as essential intermediates in the process.

Esters of isothiocyanic acid have been previously prepared. They are useful chemicals particularly as intermediates in the preparation of pesticidal and pharmaceutical compounds. For instance, they have been reacted with stoichiometric amounts of chlorine to provide N-aryl- and N-alkyl-S-chloroisothiocarbamoyl chlorides, as for example disclosed in Angew. Chem., 77, 427 (1965), and these derivatives are useful as herbicides and nematocides. They also react with a molar excess of chlorine to provide the corresponding isocyanide dichlorides which are known to be useful pesticides.

A variety of synthetic methods have been previously utilized to obtain the aforementioned esters. For example, they may be generally prepared by the reaction of primary amines with thiophosgene, but this is not a practical procedure since thiophosgene is not readily available. Some of the isothiocyanates have been prepared by the reaction of isocyanate esters with phosphorus pentasulfide, but this is not a general reaction and cannot be utilized in the preparation of all isothiocyanates. The esters have also been prepared by an involved synthetic route comprising reacting primary amines with carbon disulfide in the presence of selected bases to provide salts of dithiocarbamic acids which can then be further oxidized to the desired isothiocyanates, but this is a complicated and tedious procedure.

Now in accordance with this invention, esters of isothiocyanic acid are provided in good yield and high purity by heating O,O'-dialkyl-S-carbamoyl phosphorodithioates at a selected elevated temperature range wherein thermal dissociation occurs to provide the desired esters. It has been found that the isothiocyanates can thus be obtained at a temperature range of about 60°–200° C. although a preferred reaction temperature range of 100°–160° C. is conveniently utilized.

The O,O'-dialkyl-S-carbamoyl phosphorodithioate derivatives are themselves provided in excellent and in fact nearly quantitative yield by the reaction of isocyanic acid esters with selected O,O'-dialkyl dithiophosphoric acids. Therefore this invention provides a convenient and practical method for converting the readily available isocyanates to the corresponding isothiocyanates which have heretofore been prepared only with difficulty. The reactions described herein proceed in accordance with the following equations:

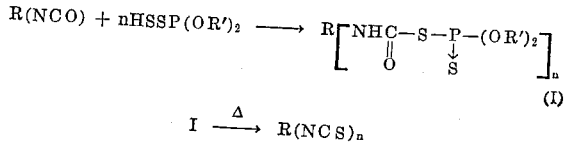

$$R(NCO) + nHSSP(OR')_2 \longrightarrow R\left[NHC-S-P-(OR')_2\right]_n$$
(I)

$$I \xrightarrow{\Delta} R(NCS)_n$$

R in the above equations represents a saturated aliphatic or substituted saturated aliphatic moiety, an aromatic or substituted aromatic moiety; R' represents alkyl having 1–5 carbon atoms, and n is an integer of 1–2.

The derivatives I wherein R is as defined above (R not representing a heterocyclic moiety) all may be utilized in the preparation of the corresponding isothiocyanates. Thus as used generally in the specification and claims herein, the term "O,O'-dialkyl-S-carbamoyl phosphorodithioates" represents the compounds I where R may be a saturated aliphatic or substituted saturated aliphatic, or an aromatic or substituted aromatic moiety. They are conveniently provided by the reaction of the appropriate monoisocyanate or diisocyanate with the selected dithiophosphoric acid. The readily available O,O'-dimethyl- and O,O'-diethyl-dithiophosphoric acids are preferably utilized in these preparations, although the acids wherein R' is alkyl having up to 5 carbon atoms may be employed if desired.

Included among the monoisocyanates RNCO and diisocyanates R(NCO)₂ which may be converted to the corresponding isothiocyanates in accordance with this invention are those wherein R represents alkyl having 1–18 carbon atoms, alkylene having 2–10 carbon atoms, haloalkyl having 1–4 carbon atoms, haloalkylene having 2–4 carbon atoms, aryl having 6–10 carbon atoms, arylene having 6–10 carbon atoms, halogenated phenyl, halogenated phenylene, nitrated phenyl, and nitrated phenylene.

The reaction of the isocyanates and diisocyanates with the dithiophosphoric acids is exothermic and can be carried out at a temperature range of about −30° C. to about 200° C. An inert diluent, i.e., diethyl ether, may be conveniently utilized in this reaction, but it is not necessary to employ a diluent especially when both reactants are liquids. One method of preparing the isothiocyanates comprises reacting the isocyanates and the dialkyl dithiophosphoric acids at a temperature range of 60° C. to 200° C. to provide the derivatives I which are immediately susceptible to thermal dissociation at this temperature range allowing the resulting formed isothiocyanates to be distilled directly from the reaction mixture.

A preferred procedure, however, involves reacting the isocyanates and diisocyanates with the organophosphorus acids below 60° C. to provide the intermediate phosphorodithioates and isolating these materials in high yield and purity as solids or oils. The phosphorodithioates are then thermally dissociated at 60° C.–200° C. in accordance with the preceding discussion to provide the desired isothiocyanates in good yield and high purity.

The O,O'-dialkyl-S-carbamoyl phosphorodithioates I where n represents an integer of 2 are also valuable pesticides in addition to having utility as intermediates in isothiocyanate preparation. In particular, the derivatives I wherein n is 2 and R represents alkylene having 2–10 carbon atoms or arylene having 6–10 carbon atoms (i.e., phenylene, tolylene, xylylene) are effective pesticides. They are excellent nematocides, and it has been found that they are extremely effective in controlling root-knot nematodes which are obligate plant parasites especially damaging to tomato and cucumber plants. These compounds also are useful soil fungicides and herbicides particularly when applied in pre-emergence treatment.

The following examples will serve to illustrate the preparation of O,O'-dialkyl-S-carbamoyl phosphorodithioates and their conversion to the corresponding esters of isothiocyanic acid.

Example 1

To 17.4 g. (0.1 mole) of 2,4-toluene diisocyanate in 75 ml. of dry ether was added dropwise and with stirring 37.2 g. (0.2 mole) of O,O'-diethyl dithiophosphoric acid. The very exothermic reaction was moderated to 30°–31° C. by means of external cooling. After standing overnight at room temperature the solvent was evaporated in vacuo affording 54.3 g. of a solid material. This solid was washed several times with hexane and dried to provide white crystals melting at 116°–117° C. The following analytical data revealed that 2-methyl-m-phenylene-bis (S-carbamoyl-O,O'-diethyl phosphorodithioate) had been obtained. Yield: 100%.

*Analysis.*—Calcd. for $C_{17}H_{28}N_2O_6P_2S_4$: C, 37.40; H, 5.17; S, 23.45. Found: C, 37.70; H, 5.13; S, 22.99.

An amount of 19.0 g. of 2-methyl-m-phenylene-bis(S-carbamoyl-O,O'-diethyl phosphorodithioate) was heated to 150° C. for 2 hours. The reaction mixture was cooled, extracted with ether, and the ether evaporated. Distillation of the residue in vacuo gave 5.1 g. of crude 2,4-toluene diisothiocyanate boiling at 108°–115° C./0.1 mm. Hg. Yield: 70.5%.

Example 2

To 16.8 g. (0.1 mole) of 1,6-hexamethylene diisocyanate was added dropwise and with stirring 37.2 g. (0.2 mole) of O,O'-diethyl dithiophosphoric acid over a period of 45 minutes. The exothermic reaction was moderated to 25°–30° C. with external cooling. After addition was completed, the mixture solidified within 2 hours at room temperature. The white cake was washed with cold hexane and dried to provide 52.5 g. of white crystals melting at 65°–66° C. The following analytical data revealed that N,N'-(1,6-hexamethylene)-bis(S-carbamoyl-O,O'-diethyl phosphorodithioate) had been obtained. Yield: 97%.

*Analysis.*—Calcd. for $C_{16}H_{34}N_2O_6P_2S_4$: C, 35.55; H, 6.34; P, 11.47. Found: C, 35.79; H, 6.45; P, 11.44.

An amount of 32.0 g. of N,N'-(1,6-hexamethylene)-bis(S-carbamoyl-O,O'-diethyl phosphorodithioate) was heated at 125°–130° C. for 2 hours. The viscous reaction product was extracted by ether, and the ethereal extract was distilled yielding 4.85 g. of crude 1,6-hexamethylene diisothiocyanate, B.P. 145°–150° C./0.1 mm. Hg. Redistillation over a column afforded the purified diisothiocyanate in a yield of 31%.

Example 3

To 15.0 g. (0.151 mole) of butyl isocyanate was added dropwise and with stirring 28.2 g. (0.151 mole) of O,O'-diethyl dithiophosphoric acid. The strong exothermic reaction was moderated by external cooling and kept at 20°–25° C. After reaction was complete, the reaction product was extracted with hexane to remove traces of contaminating starting materials. The residual material was freed from remaining traces of hexane in vacuo to provide a light tan colored oil in the amount of 41.9 g. (97% yield). Elemental analysis established this material to be the desired O,O'-diethyl-S-(N-butylcarbamoyl)-phosphorodithioate.

An amount of 71.0 g. of O,O'-diethyl-S-(N-butylcarbamonyl)phosphorodithioate was placed in a distillation apparatus equipped with a 20-inch Vigreux column. The distillation flask was heated slowly to 75°–90° C., and a vacuum of 1–2 mm. Hg. was applied to facilitate the continuous removal of butyl isothiocyanate which was collected in a receiver cooled to 0° C. The reaction afforded 16.5 g. of crude butyl isothiocyanate which upon redistillation gave 13.5 g. of the pure compound, B.P. 50° C./7.0 mm. Hg, $n_D^{22}$ 1.4980.

Example 4

An amount of 37.2 g. (0.2 mole) of O,O'-diethyl dithiophosphoric acid was added dropwise to a stirred solution of 30.8 g. (0.2 mole) of p-chlorophenyl isocyanate in 45 ml. of dry ether. The exothermic reaction was moderated by means of a cooling bath and controlled at 25° C. After standing overnight, the reaction mixture was poured into 150 ml. of hexane. A crystalline material melting at 69°–70° C. precipitated from this mixture and was isolated by filtration and dried. The following analytical data revealed that O,O'-diethyl-S-[N-(p-chlorophenyl)carbamoyl]phosphorodithioate had been obtained. Yield: 74%.

*Analysis.*—Calcd. for $C_{11}H_{15}ClNO_3PS_2$: C, 38.89; H, 4.45; P, 9.13. Found: C, 39.17; H, 4.47; P, 9.12.

p-Chlorophenyl isothiocyanate, a white crystalline material melting at 45° C., was provided in 54% yield from O,O'-diethyl-S-[N - (p - chlorophenyl)carbamoyl]-phosphorodithioate using the procedure disclosed in Example 3.

Example 5

Using the procedure shown in Example 3, O,O'-diethyl-S-(N-o-tolylcarbamoyl)-phosphorodithioate was provided in 99% yield by reacting o-tolyl isocyanate with O,O'-diethyl dithiophosphoric acid. The product is a white solid melting at 45°–46° C.

*Analysis.*—Calcd. for $C_{12}H_{18}NO_3PS_2$: C, 45.14; H, 5.68; P, 9.71. Found: C, 45.21; H, 5.73; P, 9.73.

An amount of 30.0 g. of O,O'-diethyl-S-(N-o-tolylcarbamoyl)phosphorodithioate, M.P. 45°–46° C., was heated under nitrogen for two hours at 125° C. Upon cooling, the reaction mixture separated into a highly viscous bottom layer and a mobile, yellow colored upper layer. The entire reaction mixture was extracted by ether. The content of the ether layer was distilled in vacuo over a column to afford 8.5 g. of crude o-tolyl isothiocyanate boiling at 64°–68° C./0.03 mm.

A number of other isocyanates have been converted to the corresponding isothiocyanates by intermediate formation of O,O'-dialkyl-S-carbamoyl phosphorodithioates and decomposition of these intermediates using the procedures illustrated in the foregoing examples. For illustrative purposes, the following table lists some of the other intermediates which have been prepared from reaction of isocyanates and O,O'-dialkyl dithiophosphoric acids and subsequently converted to the isothiocyanates.

TABLE I

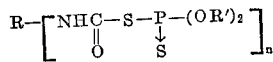

| R | M.P., °C. | $n_D$ °C. | Yield, percent | Yield of RNCS, percent |
|---|---|---|---|---|
| $C_2H_5$— | Liquid | $1.5125^{25}$ | 98.5 | 57 |
| iso-$C_3H_7$— | 70.5–1.5 | | 98 | 68.5 |
| $C_6H_5$— | Liquid | | 95 | 51.5 |
| o-Cl·$C_6H_4$— | Liquid | $1.5815^{25}$ | 100 | 44 |
| 3,4-$Cl_2C_6H_3$— | 76–7 | | 96 | 73.5 |
| m-$NO_2$·$C_6H_4$— | 80–1 | | 85.5 | 48 |

What is claimed is:
1. A process for providing esters of isothiocyanic acid which comprises heating O,O'-dialkyl-S-carbamoyl phosphorodithioates of the formula

$$\left[ R-NHC-S-P-(OR')_2 \atop \phantom{R-N}O\phantom{C-S-P}S \right]_n$$

wherein R represents alkyl having 1–18 carbon atoms, alkylene having 2–10 carbon atoms chloroalkyl having 1–4 carbon atoms, chloroalkylene having 2–4 carbon atoms, aryl having 6–10 carbon atoms, arylene having 6–10 carbon atoms, chlorinated phenyl, chlorinated phenylene, nitrated phenyl, or nitrated phenylene;

wherein R' represents alkyl having 1–5 carbon atoms; and wherein $n$ is an integer of 1–2;

at a temperature range of about 60–200° C. to provide said esters, and recovering said esters from the reaction mixture.

2. The process of claim 1 wherein a temperature range of 100°–160° C. is employed.

3. The process of claim 1 wherein each R' in said utilized O,O'-dialkyl-S-carbamoyl phosphorodithioates represents methyl or ethyl.

References Cited

UNITED STATES PATENTS

| | | | |
|---|---|---|---|
| 2,681,358 | 6/1954 | Wirth | 260—454 |
| 3,009,940 | 11/1961 | Tilles | 260—988 XR |
| 3,139,449 | 6/1964 | Axramjiam | 260—454 |

CHARLES B. PARKER, *Primary Examiner.*

D. H. TORRENCE, *Assistant Examiner.*